Figure 2:
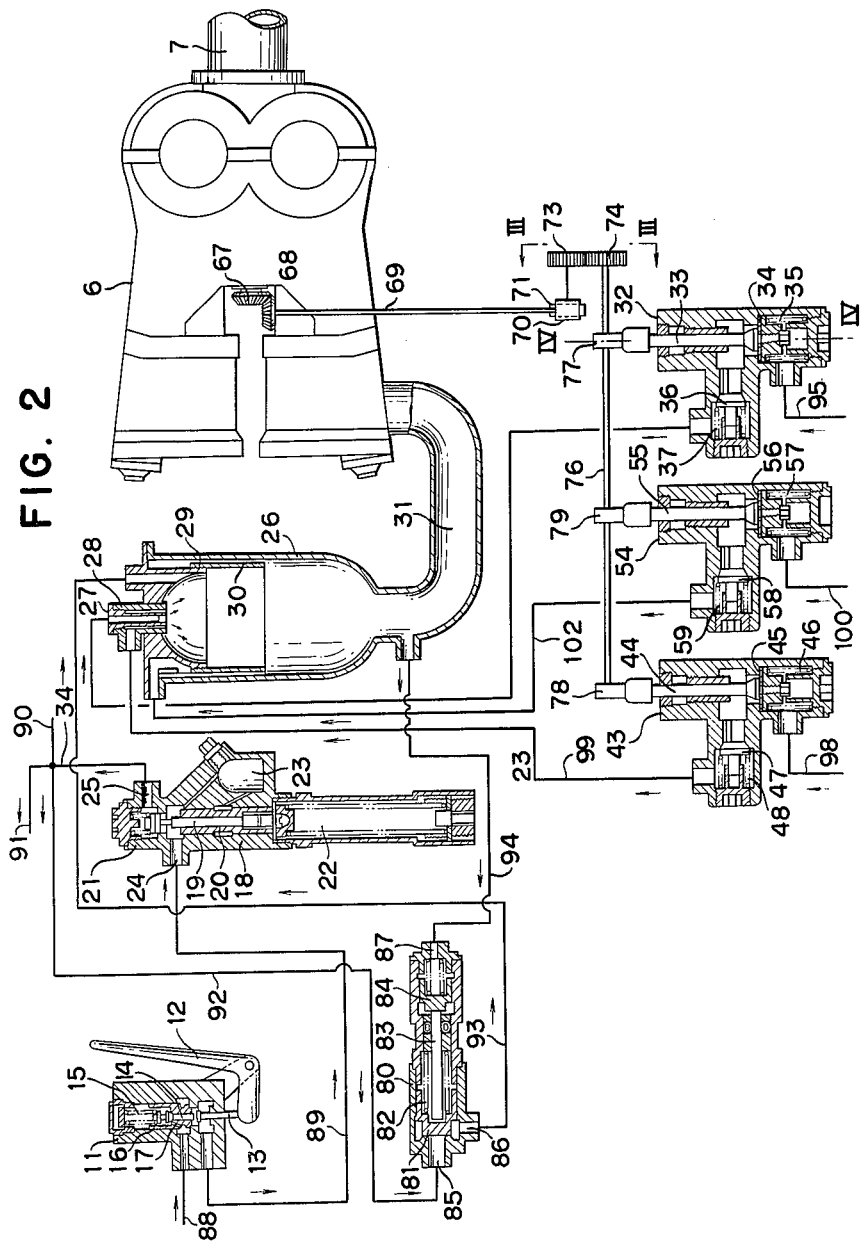

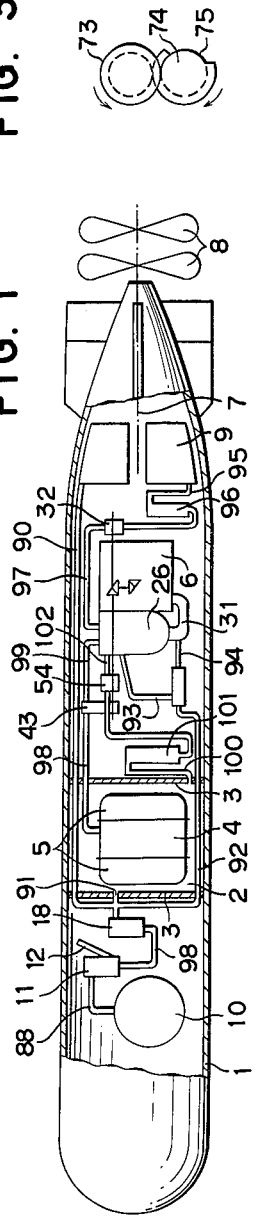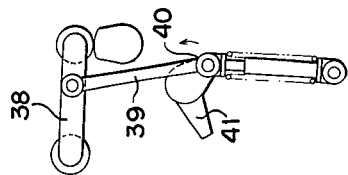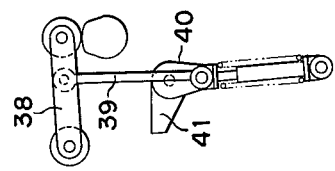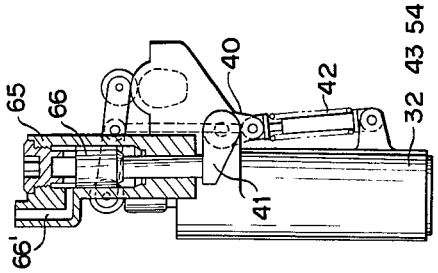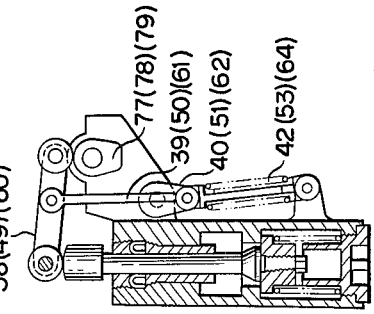

INVENTOR.
KUMAJI YOSHIMOCHI

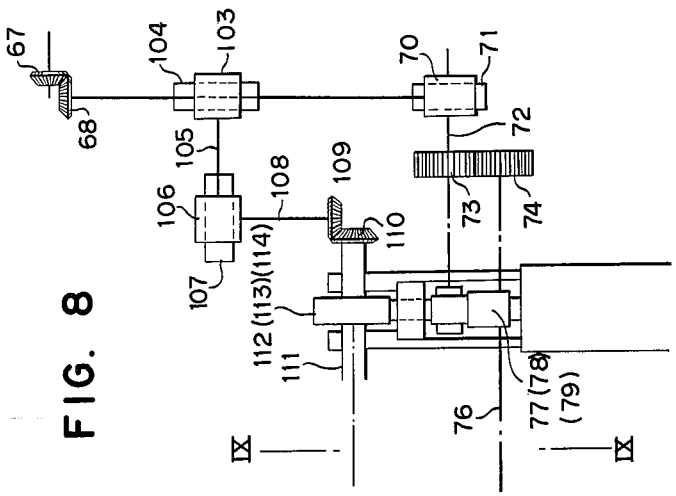

United States Patent Office 3,254,488
Patented June 7, 1966

3,254,488
SYSTEM FOR CONTROLLING A STARTING OF AN UNDERWATER SELF-PROPELLING MISSILE
Kumaji Yoshimochi, Mizunoura-machi, Nagasaki-shi, Japan, assignor to Mitsubishi Shipbuilding & Engineering Co., Ltd., Chiyoda-ku, Tokyo, Japan
Filed Mar. 17, 1964, Ser. No. 352,610
Claims priority, application Japan, Mar. 27, 1963, 38/13,854
7 Claims. (Cl. 60—39.14)

The present invention relates to a system for controlling a starting of an underwater self-propelling missile in which its propulsive engine is driven by a working combustion gas supplemented by fresh water or sea water which is introduced into a combustion gas produced by mixing a fuel with an oxidizer in a combustion chamber.

An underwater self-propelling missile with a propulsive engine driven by a working gas obtained by introducing, if required, fresh water into a high-temperature and high-pressure combustion gas produced by mixing a fuel such as petroleum or alcohol with an oxidizer such as oxygen or concentrated nitric acid has recently been developed. At the starting of an apparatus of this kind, an injection sequence of a fuel, an oxidizer, water, etc. has to be considered. If this sequence and time-lags are not proper, an explosion will result or an effective fuel will not be kept.

An object of the present invention is to eliminate such disadvantages and to provide an apparatus of this kind which performs a safe and sure starting. The main characteristic of the present invention lies in that a propulsion of an underwater self-propelling missile is generated by means of a propulsive engine driven by a high-temperature and high-pressure gas produced by injecting and mixing fresh water or sea water into a combustion gas resulting from the mixing action of a fuel and an oxidizer, and characterized by control means for controlling the timing of the injections of the fuel, the oxidizer and water in order that the propulsive engine may be started with the fuel, the oxidizer and thereafter the water is injected. For this purpose, these constituents are supplied by control means in a desired sequence timed with the engine operation with the stopping of the engine also being carried out by curtailment of these constitutents in a desired sequence.

Now, other features of the present invention will be, by way of example, explained in detail with reference to the accompanying drawings, wherein FIG. 1 is a schematic view of a vertical section of an underwater self-propelling missile provided with a starting control device according to the present invention, FIG. 2 is a view showing systematically major elements of which the missile in FIG. 1 is composed, FIG. 3 is a view on the line III—III in FIG. 2 looking in the direction indicated by the arrow, FIG. 4 is a sectional view taken on the line IV—IV in FIG. 2, FIG. 5 is a view similar to FIG. 4, showing a stop valve and a control valve, FIG. 6 is a view showing a control valve mechanism in a state of starting, FIG. 7 is a view showing a control valve mechanism in a state of stop, FIG. 8 is a view showing systematically another example of the control valve mechanism, and FIG. 9 is a view on the line IX—IX in FIG. 8 looking in the direction indicated by the arrow.

Referring to FIGS. 1–7, 1 designates a substantially cylindrical outside shell of an underwater self-propelling missile; 2 a watertight fresh water chamber defined by bulkheads 3, 3 within said shell. An oxidizer chamber 4 is supported in the fresh water chamber 2 and is provided with flexible diaphragm parts 5, 5. An engine 6 is arranged to drive propellers 8, 8 through a propeller shaft 7. A fuel chamber 9 is defined around about the propeller shaft 7. An air chamber 10 containing air having a pressure of about 200 kg./cm.$^2$ is located in the forward end of shell 10 together with a starting valve 11 provided with a lever 12. As seen in FIG. 2, the valve 11 includes a rod 13, a pilot valve 14, a spring 15, a main valve 16, and a narrow hole 17 in the main valve 16. A reducing valve generally designated 18 which is connected to the starting valve 11 is provded with a valve stem 19, a sleeve 20, springs 21, 22, an oil chamber 23, a high-pressure chamber 24, and a low-pressure chamber 25.

A combustion chamber 26 located in the shell is provided with a fuel nozzle 27, an oxidizer nozzle 28. A water passage 29 is defined between the outside wall of the combustion chamber 26, and an inside wall 30. A gas feed pipe 31 connects the combustion chamber 26 with the suction part of the engine 6. A fuel control valve 32 for controlling the fuel supplied to the combustion chamber 26 includes a valve rod 33, a valve plate 34, a spring 35, a pressure check valve 36, a spring 37, a lever 38, a rod 39, levers 40, 41, and a spring 42. An oxidizer control valve 43 for controlling the oxygen supply to the combustion chamber 26 is provided with a valve rod 44, a valve plate 45, a spring 46, a pressure check valve 47, a spring 48, a lever 49, a rod 50, levers 51, 52, and a spring 53. The amount of fresh water delivered to chamber 26 is regulated by a fresh-water control valve provded with a valve rod 55, a valve plate 56, a spring 57, a pressure check valve 58, a spring 59, a lever 60, a rod 61, levers 62, 63, and a spring 64.

As indicated in detail in FIG. 5 a stop valve 65 is provided for each of control valves 32, 43, 54 and equipped with both a ram 66 and an air hole 66'.

The engine 6 drives a bevel gear 67 for driving auxiliary machines via a bevel gear 68 which is affixed to one end of an auxiliary-machines shaft 69. A worm 70 fixed to the other end of the shaft 69 drives a worm wheel 71 fixed to one end of a shaft 72. A gear 73 fixed to the other end of the shaft drives a gear 74 having a recessed portion 75. The gear 74 is affixed to a starting-cams shaft 78 having starting cams 77, 78, 79 which operate the control valves 32, 54 and 43. A change valve 80 is provided with a valve 81 a spring 82, a rod 83, a piston 84, an inlet hole 85, an outlet hole 86, and a back-pressure hole 87.

An air pipe 88 (FIG. 1) connects the air chamber 10 with the inlet of the starting valve 11. An air pipe 89 extends from the outlet of the starting valve 11 to the high-pressure chamber 24 of the reducing valve 18. An air pipe 90 connects the low-pressure chamber 25 of the reducing valve 18 with the upper part of the fuel chamber 9. An air pipe 91 also connects the low-pressure chamber 25 of the reducing valve 18 with the fresh water chamber 2. An air pipe connects the low-pressure chamber 25 of the reducing valve 18 with the inlet hole 85 of the change valve 80 and an air pipe 93 connects the outlet hole 88 of the change valve 80 with the combustion chamber 26. The gas feed pipe 31 is connected with the back-pressure hole 87 of the change valve 80 by a gas pipe 94 and a liquid feed pipe 95 connects the lower part of the fuel chamber 9 with the inlet of the fuel control valve 32 through a gas-liquid separator 96. The outlet of the fuel control valve 32 is connected via liquid feed pipe 97 with the fuel nozzle 27 of the combustion chamber 26 and a liquid feed pipe 98 connects the outlet of the oxidizer chamber 4 with the inlet of the oxidizer control valve 43. The outlet of the oxidizer control valve 43 is connected with the oxidizer nozzle 28 of the combustion chamber 26 by a liquid feed pipe 99 and a water pipe 100 connects the lower part of the fresh water chamber 2 with the inlet of the fresh-water control valve 54 through a gas-water separator 101. A water pipe 102 connects the outlet of the fresh-water control valve 54 with the water passage 29 of the combustion chamber 26. Each of control valves 32, 43, 54 have the same construction, three reference numbers are given to each element shown in FIG. 4. The same applies to the case of the stop valve 65 shown in FIGS. 4–7.

Next, referring to FIGS. 8 and 9, a fuel control valve 32' is provided with a valve rod 33', a valve plate 34', a spring 35', a pressure check valve 36', a spring 37', a lever 38', and a rod 39'. An oxidizer control valve 43' is provided with a valve rod 44', a valve plate 45', a spring 46', a pressure check valve 47', a spring 48', a lever 49', and a rod 50'; 54' a fresh-water control valve provided with a valve rod 55', a valve plate 56', a spring 57', a pressure check valve 58', a spring 59', a lever 60', and a rod 61'; 103 a worm fixed to the auxiliary-machines shaft 69. A worm wheel 104 which is affixed to one end of a shaft 105 drives a worm 103 and shaft 105 carries a worm 106 which is fixed to the other end of the shaft 105 and drives a worm wheel 107 fixed to one end of a shaft 108. A bevel gear 109 fixed to the other end of the shaft 108 drives a bevel gear 110 affixed to stop-cam shaft 111 having both the bevel gear 110 at one end and stop cams 112, 113, 114; 115, 116 and 117. Each of control valves 32', 43', 54' have the same construction as does each of stop cams 112, 113, 114.

In such an apparatus as mentioned above, prior to the firing of the missile, the fuel chamber 9 is filled with for example industrial absolute alcohol while the oxidizer chamber 4 is filled with nitric acid having the concentration of about 98%. Besides, the fresh water chamber 2 is filled with fresh water. Instead of providing the fresh water chamber 2, sea water pumped by means of a sea water pump (not shown) may be used.

Now, in order to perform the starting of such a missile, the lever 12 of the starting valve 11 has to be turned in a clockwise direction in FIG. 2 either by the use of the inertia of the missile at the firing or through other proper operable means. The starting valve 11 is constructed in such a manner that the main valve 16 may be kept in the closing position under the combined action of the spring 15 and compressed air which flows into the back of the main valve 16 around the rod 13 causes, at said turning of the lever 12, the pilot valve 14 to be lifted. At the same time, compressed air behind the main valve 16 flows out downward through around the pilot valve 14 as the main valve 16 is automatically pushed upward. As a result, compressed air in the air chamber 10 flows into the high-pressure chamber 24 of the reducing valve 18 through the air pipe 88, the starting valve 11, and the air pipe 89. Compressed air in the high-pressure chamber 24 pushes the valve 19 upwardly against the spring 21 and passes through the gap round the valve 19, and flows into the low-pressure chamber 25, where the pressure of said air is reduced to about 50 kg./cm.² by means of the throttling gap. At the same time, compressed air in the high-pressure chamber 24 pushes the sleeve 20 downwardly by the action of the oil in the oil chamber 23 and thereby limits the size of the gap formed round the valve 19. Therefore, the internal pressure in the low-pressure chamber 25 is kept almost constant.

Compressed air in the low-pressure chamber 25 exerts pressure on both the fuel chamber 9 and the fresh water chamber 2 through the air pipes 90, 91, respectively. Owing to this, the fuel and fresh water are forced into the fuel control valve 32 and the fresh water control valve 54 through the liquid feed pipes 95, 100, respectively. Besides, under the influence of pressure, the flexible diaphragm part 5 of the oxidizer chamber 4 is made to deform, the oxidizer itself being forced into the oxidizer control valve 43. At this time, control valves 32, 43, 54 are still in the closing positions and there is no injection of liquids into the combustion chamber 26. Compressed air in the low-pressure chamber 25 enters, further, the change valve 80 through the air pipe 92, in which said air pushes the valve 81 open against the spring 82. As a result, compressed air enters the combustion chamber 26 through the air pipe 93, passes through the gas feed pipe 31, and enters the engine 6 to revolve it. The revolutions of the engine 6 are transmitted to the starting-cams shaft 76 through the bevel gears 67, 68, the shaft 69, the worm 70, the worm wheel 71, the shaft 72, and the gears 73, 74, both said cam shaft 76 and the starting cams 77, 78, 79 being turned.

Because the fuel control valve 32, the oxidizer control valve 43 and the fresh water control valve 54 have the same construction and working mechanism, only the fuel control valve 32 will be explained in detail. The lever 38 is turned about the pivot of the rod 39 in a counterclockwise direction by means of the starting cam 77 acting on the valve rod 33. The valve plate 34 is pushed downward against the spring 35 (FIG. 4) and the fuel, having reached the inlet of the fuel control valve 32, enters the valve and is injected into the combustion chamber 26 through the pressure check valve 36, the liquid feed pipe 97, and the fuel nozzle 27. Likewise, the oxidizer control valve 43 and the fresh water control valve 54 are pushed open by means of the rotation of starting cams 78, 79, respectively, the oxidizer and fresh water being injected into the combustion chamber 26 through the oxidizer nozzle 28 and the water passage 29 respectively. At this time, the fuel control valve 32 is first opened, next the oxidizer control valve 43, and lastly the fresh water control valve 54 by the action of the starting cams 77, 78, 79 which are arranged to be operated in this manner. Thus, the fuel is first injected into the combustion chamber 26, later the oxidizer is injected so that both constituents are mixed with each other to produce the combustions gas. Still later, fresh water is introduced into the combustion chamber 26 to cool the inside wall 30 thereof; said water itself being changed by heat into vapor which is mixed with the combustion gas. The fuel injection is, preferably, performed in about 1.5 seconds after having introduced air into the combustion chamber 26. It is also preferable that, about half a second later after this, the oxidizer is injected, lastly fresh water being injected in 0.5–1 second after the oxidizer injection. Thus, a safe and sure combustion can be obtained by such an injection sequence and time-lags as started above. An injection of the oxidizer before the fuel would bring forth an explosion and an early injection of water would cause a misfire or an interruption of the combustion.

The combustion gas in the combustion chamber 26 reaches the engine 6 by way of the gas feed pipe 31 to drive the engine. Some of the combustion gas enters the gas pipe 94 and reaches the back-pressure hole 87 of the change valve 80 to close the valve 81 through the piston 84 and the rod 83. Therefore, the feeding of the compressed air for the starting into the combustion chamber 26 through the air pipe 93 is stopped. Immediately after the control valves 32, 43 54 have been opened by means of the starting cams 77, 78, 79 respectively, the recessed portion 75 of the gear 74 comes to be engaged with the gear 73, which only rotates but causes both the gear 74 and the starting-cams shaft 76 to stop. As a result, each control valve 32, 43, 54 is kept in the opened condition, the fuel, the oxidizer, and water being continuously injected into the combustion chamber 26 for the unbroken combustion. At this time, the feeding quantities of the fuel, the oxidizer, and water are continuously regulated for proper combustion in the combustion chamber 26, being controlled by the inside diameters of the fuel nozzle 27, the oxidizer nozzle 28, and the nozzle at the inlet of the water passage 29, respectively. If absolute alcohol is used as the fuel, concentrated nitric acid as the oxidizer, and moreover the fuel, the oxidizer, and water are in the ratio 1:2.2–2.5:2.5–2.8, the temperature of the combustion chamber reaches about 700–800° C.

Thus, the continuous driving of the engine 6 is caused by the gas produced in the combustion chamber 26 without stopping, the propellers 88, being turned through the propeller shaft 7. As a result, the missile 1 comes to move forward.

In order to stop the underwater missile, the feeding of the fuel and the oxidizer is discontinued. For example, at the end of the predetermined total revolutions of the engine, an automatic control means (not shown), causes compressed air in the air chamber 10 to be introduced into the stop valve 65 of the control valves 32, 43, 54 (FIG. 5). Now, referring to the stop valve of the fuel control valve 32, the levers 41 and 40 are united with each other. If compressed air having entered the air hole 66' pushes downward both the ram 66 and the lever 41, the lever 40 is turned in an anticlockwise direction and the rod 39 is lifted. The left end of the lever 38, to which the rod 39 is pivoted, touches the valve rod 33, which is subjected to the upward force caused by the spring 35. Therefore, if the rod 39 is raised, the lever 38 is turned in a clockwise direction, the valve rod 33 being pushed upward by means of the spring 35. As a result, the fuel control valve 32 comes to be closed (FIGS. 6 and 7). Likewise, the oxidizer control valve 43 and the fresh water control valve 54 may be closed. The closings of those control valves 32, 43, 54 may be performed either concurrently under the control of air entering each stop valve 65 or in a determined sequence, for instance first the oxidizer control valve 43 then the fuel control valve 32 and lastly the fresh-water control valve 54. If the combustion in the combustion chamber 26 comes to an end, the pressure in the gas feed pipe 31 as well as the combustion chamber 26 is reduced, the gas pressure behind the piston 84 of the change valve 80 being also reduced through the gas pipe 94. As a result, the change valve 80 is again opened, causing compressed air to enter the combustion chamber 26. Any oxidizer, etc. remaining in the chamber 26 is thus forced out so that corrosion of the combustion chamber 26 and other pipes may be prevented.

Next, the working mechanism of a control valve shown in FIGS. 8 and 9 will be explained. The starting of the engine or the opening of each control valve is substantially the same as that in the embodiment described above. In said embodiment, however, the stop valve 65 is used for closing each control valve at the stop of the self-propelling missile, while in this example stop cams 112, 113, 114, instead of the stop valve 65, are provided. Namely, the stopping of the engine is performed in such a manner if recessed portions 115, 116, 117 provided at the stop cams 112, 113 114 respectively come into an engagement with the upper parts of rods 39', 50', 61' respectively. By means of said cams on the stop-cams shaft 111 which rotate slowly because of the reduced speed transmitted from the engine 6 through the bevel gears 67, 68, the auxiliary-machines shaft 69, the worm 103, the worm wheel 104, the shaft 105, the worm 106, the worm wheel 107, the shaft 108, and the bevel gears 109, 110, the levers 38', 49', 60' are turned in a clockwise direction, valve rods 33', 44', 55', being pushed upward as described in the first embodiment. Therefore, each of control valves 32', 43', 54' is closed, the engine 6 being stopped. The total number of revolutions of the engine counted until the recessed portions 115, 116, 117 are engaged with the upper parts of the rods 39', 50', 61' respectively is determined by the check of the starting positions of said portions. Therefore, the distance the missile will cover may be predetermined by a proper setting of the starting positions of the stop cams 112, 113 114. Besides, the closings of the control valves 32', 43', 54' may be performed in a given sequence, for instance, of the oxidizer control valve 43', the fuel control valve 32', and lastly the fresh water valve 54'. At the end of the combustion in the combustion chamber 26, the engine 6 as well as the combustion chamber 26 may be scavenged by means of compressed air injected into said chamber through the air pipe 93, as performed in the above-mentioned embodiment.

As described above, the underwater self-propelling missile of the present invention has the following advantages: (a) the missile may perform the safe and sure starting (b) the engine of the missile may stop at the end of the run of a given distance, and (c) corrosion of the interiors of both the engine and the combustion chamber by the fuel constituents after the stoppage of the engine may be prevented.

In short, according to the present invention, the underwater self-propelling missile having the propulsion engine driven by the high-temperature and high-pressure gas produced by injecting and mixing fresh water or sea water into the combustion gas resulting from the mixing action of a fuel and an oxidizer is provided with control devices controlling injections of the fuel, the oxidizer, and water in order that the propulsive engine may be started with the fuel, and thereafter operated with the oxidizer and lastly water. Thus, the apparatus of this kind which is capable of performing the safe and sure starting may be realized.

It is to be understood, of course, that numerous modifications may be made without departing from the spirit and scope of the present invention as set forth in the appended claims.

Having thus described the invention, what is claimed as new and desired to be secured by Letters Patent, is:

1. An underwater missile comprising a shell, propeller means on said shell for propelling said shell through the water, a combustion engine in said shell including a combustion chamber for igniting fuel constituents and generating combustion gases and propulsion means connected to said propeller means and driven by said combustion gases to rotate said propeller means, fuel control valve means connected to said combustion chamber for supplying fuel to said combustion chamber, oxidizer control valve means connected to said combustion chamber for supplying oxidizer to said combustion chamber, water control valve means connected to said combustion chamber for supplying water to said combustion chamber, control valve drive means engageable with each of said fuel control valve means, said oxidizer control valve means and said water control valve means to operate each in sequence and to supply first fuel, thereafter oxidizer and thereafter water to said combustion chamber, air pressure means in said shell for supplying air under pressure to said combustion engine for providing initial operation thereof and for scavenging said combustion chamber upon stopping of the operation thereof, and control means connected to said fuel control valve means, said oxidizer control valve means, said water control valve means and said air pressure means for initiating first the operation of said fuel control valve means, thereafter said oxidizer control valve means and thereafter said water control valve means during the start-up of the engine and for timing said control valve means by the operation of the engine thereafter and for further providing a flow of air from said air pressure valve means to said combustion chamber for clearing said combustion chamber after said engine has been stopped.

2. An underwater missile according to claim 1, wherein said air pressure means is connected to said fuel control valve means, said oxidizer control valve means and said water control valve means to close them in a predetermined sequence upon the stopping of said engine.

3. An underwater missile comprising a shell, propeller means on said shell for propelling said shell through the water, a combustion engine in said shell including a combustion chamber for igniting fuel constituents and generating combustion gases, propulsion means connected to said propeller means and driven by said combustion gases to rotate said propeller means, a fuel control valve means connected to said combustion chamber for supplying fuel to said combustion chamber, oxidizer control valve means connected to said combustion chamber, oxidixer control valve means connected to said combustion chamber for supplying oxidizer to said combustion chamber, a fresh water tank in said shell, water control valve means connected to said fresh water tank and said combustion chamber for supplying fresh water to said combustion chamber, a cam shaft driven by said propulsion means and engageable with each of said fuel control valve means, said oxidizer control valve means and said water control valve means to operate them in sequence, air pressure means in said shell for supplying air under pressure to said combustion engine for providing initial operation thereof, and control means connected to said fuel control valve means, said oxidizer control valve means, said water control valve means and said air pressure means for initiating first the opertaion of said fuel control valve means, thereafter said oxidizer control valve means and thereafter said water control valve means during the start-up of the engine.

4. An underwater missile comprising a shell, propeller means on said shell for propelling said shell through the water, a combustion chamber in said shell for igniting fuel constituents and generating combustion gases, propulsion means connected to said propeller means and driven by said combustion gases to rotate said propeller means, fuel control valve means connected to said combustion chamber for supplying fuel to said combustion chamber, oxidizer control valve means connected to said combustion chamber for supplying oxidizer to said combustion chamber, water control valve means connected to said combustion chamber for supplying water to said combustion chamber, valve drive means including a cam shaft driven by said propulsion means and engageable with each of said fuel control valve means, said oxidizer control valve means and said water control valve means to operate said valve means in sequence and to supply first fuel, thereafter oxidizer and thereafter water to said combustion chamber starting with the initiation of the operation thereof, air pressure means in said shell connected to each of said valve control means for supplying air under pressure for operating said valve control means including control means connected to said fuel control valve means, said oxidizer control valve means, said water control valve means and said air pressure means for initiating first the operation of said fuel control valve means, thereafter said oxidizer control valve means and thereafter said water control valve means during the start-up of the engine and for insuring the timed sequence of said control valve means by the operation of the engine thereafter and for further providing a flow of air from said air pressure valve means to said combustion chamber for clearing said combustion chamber after said engine has been stopped.

5. An underwater missile according to claim 4 wherein said combustion chamber includes an inner wall and an exterior wall, and means connected to said water control valve means for directing water from said control valve means into said combustion chamber in the space between said inner and outer walls.

6. An underwater missile according to claim 4, wherein said inner wall of said combustion chamber does not extend along the complete length of said combustion chamber whereby the water directed between said walls is directed into said combustion chamber at the termination of said interior wall.

7. An underwater missile according to claim 4, including a stopping device connected to each of said fuel control valve means for stopping the supply of fuel, oxidizer and water to said engine in a selected sequence.

References Cited by the Examiner
UNITED STATES PATENTS 1,450,597    4/1923    Kasley             114—20.1
2,402,826    6/1946    Lubbock        60—39.55 X

OTHER REFERENCES

American Rocket Society Journal; December 1949, page 166–184, entitled "Torpedo-Propulsion Systems," by Frederich A. Maxfield, pages 176–183 relied on.

MARK NEWMAN, *Primary Examiner.*

RALPH D. BLAKESLEE, *Examiner.*